(12) United States Patent
Ellmer

(10) Patent No.: US 7,024,300 B2
(45) Date of Patent: Apr. 4, 2006

(54) METHOD FOR ADAPTING AN ACTUATION DISTANCE MODEL FOR AN EXHAUST TURBOCHARGER

(75) Inventor: Dietmar Ellmer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 366 days.

(21) Appl. No.: 10/625,651

(22) Filed: Jul. 24, 2003

(65) Prior Publication Data

US 2006/0000213 A1 Jan. 5, 2006

(30) Foreign Application Priority Data

Jul. 25, 2002 (DE) .................. 102 33 951

(51) Int. Cl.
*F02D 23/00* (2006.01)
*F02B 37/12* (2006.01)
*G06G 19/00* (2006.01)

(52) U.S. Cl. ..................... 701/103; 60/602

(58) Field of Classification Search ........... 60/600, 60/601, 602, 603; 123/559.1, 564; 701/101, 701/102, 103
See application file for complete search history.

(56) References Cited

U.S. PATENT DOCUMENTS

| | | | | |
|---|---|---|---|---|
| 5,123,246 A | * | 6/1992 | Younessi et al. | 60/602 |
| 6,272,860 B1 | * | 8/2001 | Klein et al. | 60/602 |
| 6,425,246 B1 | * | 7/2002 | Schmid | 60/602 |
| 6,510,691 B1 | * | 1/2003 | Schmid | 60/602 |
| 6,536,214 B1 | * | 3/2003 | Finger et al. | 60/602 |
| 2004/0011340 A1 | * | 1/2004 | Hosny et al. | 123/559.1 |

FOREIGN PATENT DOCUMENTS

DE 3817246 A1 * 11/1989
JP 10-47071 A * 2/1998

* cited by examiner

*Primary Examiner*—Willis R. Wolfe, Jr.
(74) *Attorney, Agent, or Firm*—Morrison & Foerster LLP

(57) ABSTRACT

Parameters of an actuation distance model are adapted for an exhaust turbocharger actuator. For this, in the stationary or quasi-stationary operating state of the internal combustion engine, a first actuator is activated in the exhaust tract. The parameters of the actuation distance model are adapted on the basis of a comparison of the actual and target values for a modified state variable at the turbine. The change brought about by activation of the first actuator is compensated by activation of a second actuator in the fresh air tract.

14 Claims, 3 Drawing Sheets

METHOD FOR ADAPTING AN ACTUATION DISTANCE MODEL FOR AN EXHAUST TURBOCHARGER

CLAIM FOR PRIORITY

This application claims priority to International Application No. 10233951.1 which was filed in the German language on Jul. 25, 2002, which is hereby incorporated by reference.

TECHNICAL FIELD OF THE INVENTION

The present invention relates to a method for adapting an actuation distance model for an exhaust turbocharger in an internal combustion engine.

BACKGROUND OF THE INVENTION

Actuators for controlling the turbine response of an exhaust turbocharger in practice exhibit a certain scattering in respect of their actuation effect and their activation signals. The fundamental causes of this lie in the component tolerances in the manufacturing process and in the severe environment in which they are deployed. Scattering causes actuator delay and activation errors in actuator modeling in the actuation distance model as part of boost pressure regulation. Specific adjustment of model parameters is not known.

SUMMARY OF THE INVENTION

The invention discloses a method for adapting an actuation distance model that uses simple means to adapt parameters for an actuator reliably at the lowest possible cost.

In one embodiment of the invention, in a first stage the stationary or quasi-stationary operating state of the internal combustion engine is identified. Once a stationary or quasi-stationary operating state has been identified, a first actuator for the exhaust turbocharger in the exhaust tract is activated. A second actuator in the intake tract is also activated so that the internal combustion engine remains in the operating state. Activation of the second actuator compensates for the effect resulting from activation of the first actuator.

In a subsequent stage of the method, a state variable is determined at the turbine and the expected and measured changes in the state variable at the turbine are subsequently compared. The difference between the actual and target values of the state variable at the turbine is used to determine a correction value for the activation signal of the first actuator. With the inventive method, a correction signal for the activation of the first actuator is identified without changing the operating state of the internal combustion engine. If the first actuator is activated via an actuation distance model, the identified correction values can be used to modify the actuation distance model, bringing about a change in the activation signals for the first actuator.

With the inventive method, a distinction can be made between two approaches to achieve constant operating states. With the first state, the operating points for combustion, such as ignition angles, are kept constant. With a second approach, work is carried out to achieve combustion without constant operating points, which can result in a non-optimal combustion response during the adaptation phase. However, with both approaches, effective torque and engine speed at least are constant, so that the driver does not notice the adaptation process.

In a preferred embodiment of the inventive method, one or more actuator units for a waste gate position, a turbine blade angle, the position of a sliding sleeve on the exhaust turbocharger and/or electric actuators with and without position feedback as well as bellows at over- and under-pressure are provided as the first actuator in the exhaust tract. These first actuator units are activated when the internal combustion engine is in a stationary operating state.

In another embodiment of the inventive method, one or more actuator units for a throttle valve, a return check system and/or a return valve are provided as the second actuator in the intake tract.

In a preferred embodiment, the stationary or quasi-stationary operating state is identified based on the values for engine speed, fill level, content composition in the case of internal exhaust gas recirculation, quantity injected, ignition angle, engine torque and valve gear mechanism. These variables are supplied to the engine control unit for the correct operation of the internal combustion engine so they do not have to be detected specifically to identify the stationary or quasi-stationary operating state.

Staged activation of the first actuator has proved to be a particularly reliable method of activation. Here the extent of the stage and the interval between stages are preferably selected so that the change in the state variable can be detected at each stage. Therefore depending on the operating state, the level of the activation signal and the interval between activation signals can be selected so that the effect produced by activation is clearly detectable.

As the effect of the first actuator has to build up over time, it has proved expedient to activate the second actuator after a delay period. The delay period may for example depend on the actuation distance model.

It has proved particularly advantageous for the inventive method for the stationary or quasi-stationary operating state to be identified during unboosted operation. In order to keep the effect of activation of the first actuator as small as possible, it has proved expedient to activate the first actuator in operating states in which a change in the exhaust gas back-pressure only results in slight modification of the operating state of the internal combustion engine. A value can also be determined that gives a minimum value for a response on the part of the actuation distance to an activation signal for the first actuator. It is hereby ascertained whether an identifiable change occurs in the actuation distance due to the activation signal (black and white approach).

In another embodiment, the state variable at the turbine is determined on the basis of measurements. In an alternative embodiment, the state variable at the turbine is determined from measurement and model values or solely based on model values for the exhaust gas tract. It has proved particularly advantageous to select turbine power as the state variable at the turbine.

So that adaptation of the distance parameters is not noticed by a user, torque and engine speed are kept constant by activating the first and second actuators.

BRIEF DESCRIPTION OF THE DRAWINGS

The invention is described in more detail below using exemplary embodiments, in which.

DETAILED DESCRIPTION OF THE INVENTION

Figure 1:
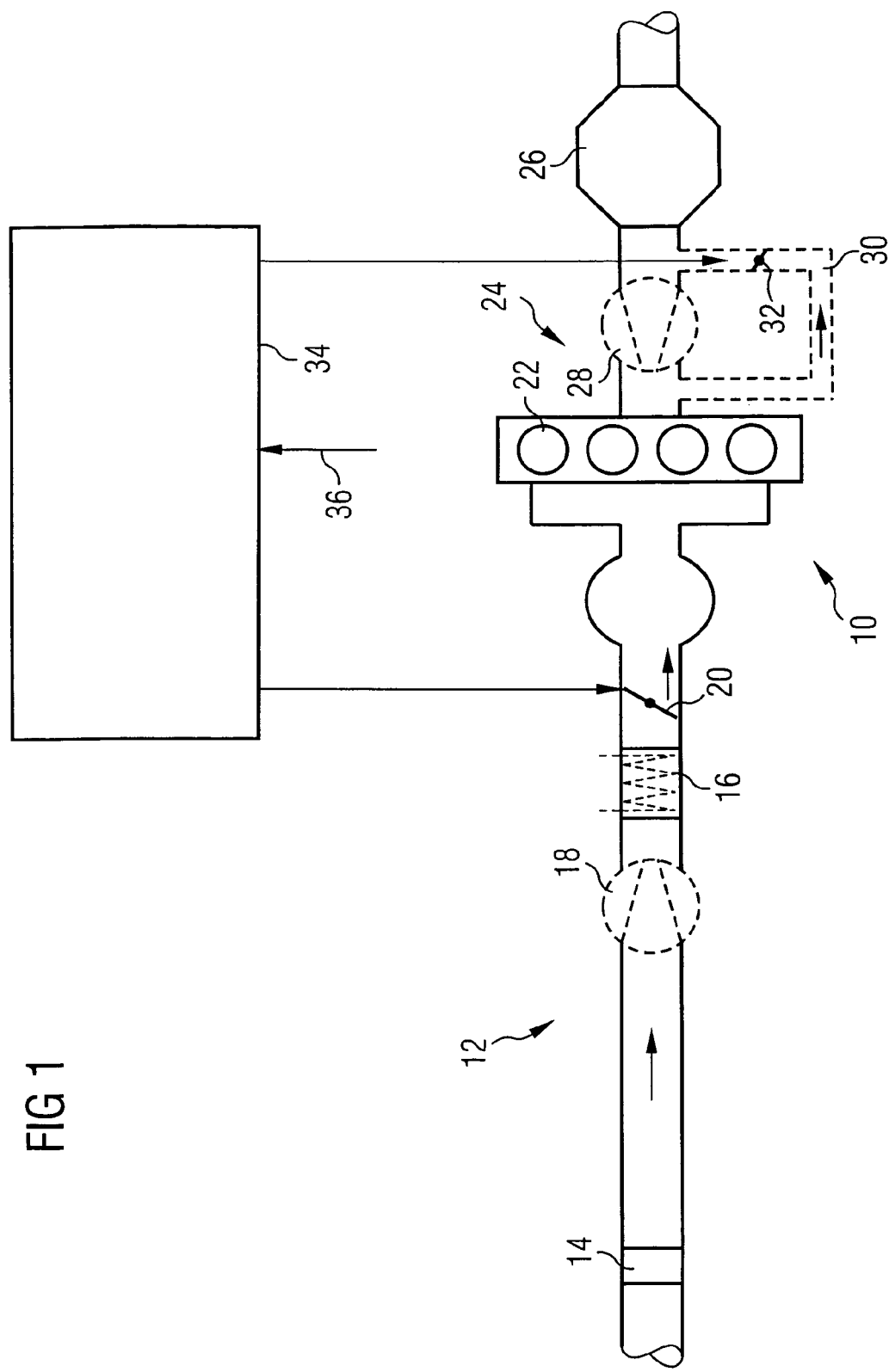
FIG. 1 is a schematic view of an internal combustion engine.

FIG. 1 shows a schematic view of an internal combustion engine 10. Fresh air is supplied to the internal combustion engine via an intake tract 12. The fresh air supply flows through an air filter 14 and a charging air cooler 16. Upstream from the charging air cooler 16 is a compressor 18 of an exhaust turbocharger. Downstream from the charging air cooler 16 is a throttle valve 20. The compressed fresh air enters one of the cylinders 22. For the sake of clarity only four cylinders are shown in the Figure. Downstream from the internal combustion engine 10 is the exhaust tract 24 with a catalytic converter 26.

Upstream from the catalytic converter 26 is a turbine 28 of the exhaust turbocharger. It does not need to be explained that the turbine 28 is linked to the compressor 18, to drive the compressor 18 via the turbine 28 during operation.

A bypass 30 with a waste gate 32 is provided parallel to the exhaust tract 24 in proximity to the turbine 28. FIG. 1 shows that an engine control unit 34 activates the waste gate 32 and the throttle valve 20. State values relating to the operating state of the internal combustion engine 22 are supplied as data 36 to the engine control unit 34.

With the adaptation method according to the invention, the waste gate 32 is activated in stages. Closing the waste gate 32 causes an increase in exhaust gas back-pressure. In order to keep the speed and torque of the internal combustion engine constant, this is compensated for by the throttle valve 20. In the case of gas engines it has proved particularly favorable to increase the fresh air level and to deploy delayed ignition whilst increasing exhaust gas mass and temperature without affecting the torque.

Figure 2:
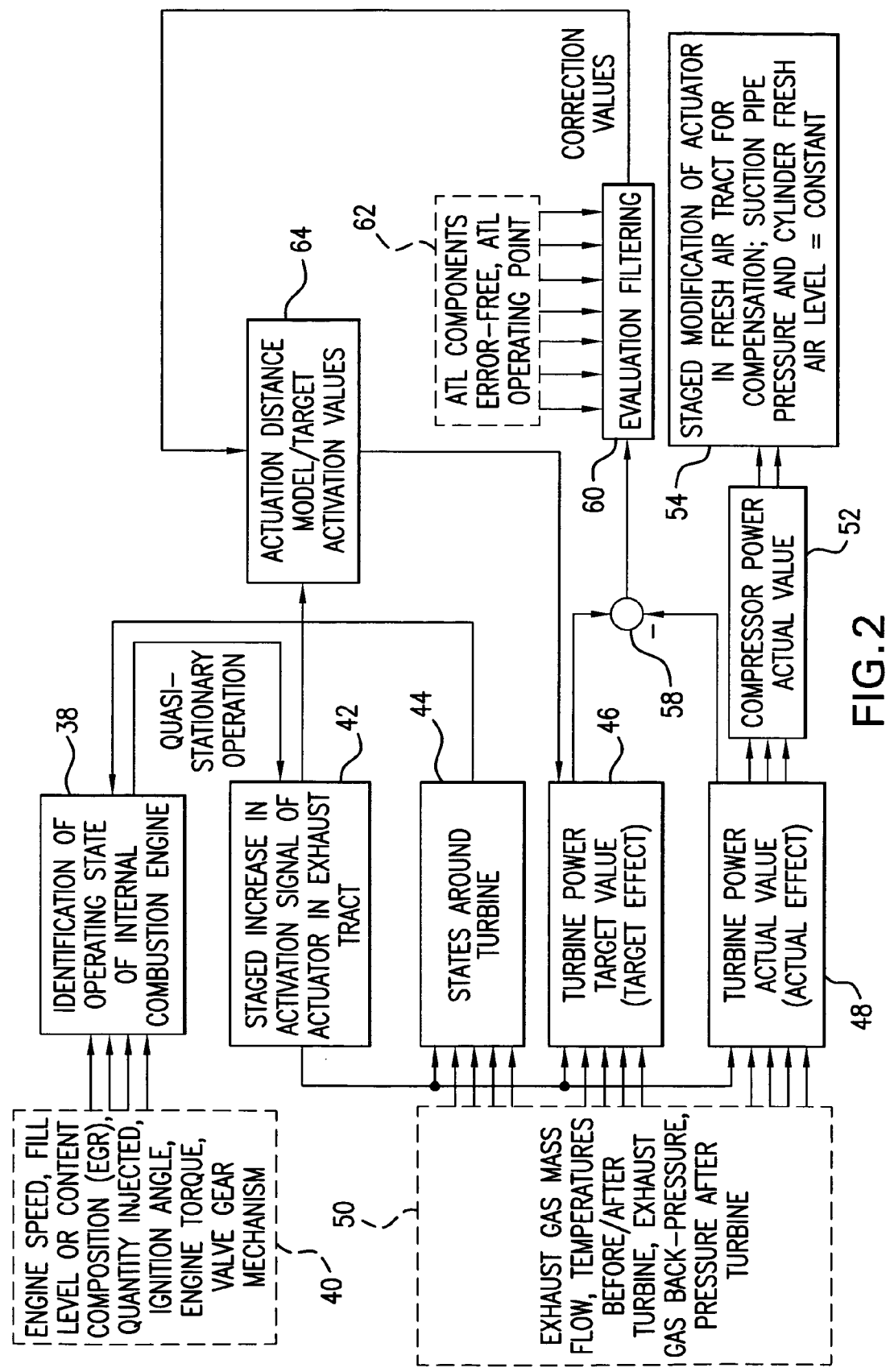
FIG. 2 is a first embodiment of the invention in block diagram form.

A preferred embodiment of the invention is described in more detail with reference to FIG. 2. In a first stage of the method 38, the internal combustion engine is identified as having a stationary operating state. This preferably takes place during unboosted operation. The input variables for stationary operation identification 38 are the values summarized in the block 40 for engine speed, fill level, content composition (EGR), quantity injected, ignition angle, engine torque and valve gear.

When a stationary or quasi-stationary operating state is identified, in stage 42 the activation signal for the actuator in the exhaust tract is increased in stages. Activation of the actuator results in changes to the states at the turbine. These are detected in stage 44 and fed back to the stationary operation identification 38. In this way changes in stationary operation can be quickly and reliably identified.

In method stage 46, the target value for turbine power is identified based on the activation signal for the first actuator. In method stage 48, the actual value for turbine power is identified. In method stages 44 to 48, the values 50 for exhaust gas mass flow, temperatures before and after the turbine, exhaust gas back-pressure and pressure after the turbine are supplied via the engine control unit. The variables 50 can be directly measured values or model values from the engine control unit.

The actual value for turbine power is converted to an actual value for compressor power in stage 52. Based on the actual value for compressor power, in stage 54 the actuator in the fresh air tract is modified in stages to compensate for the first actuator. The object of compensation is to keep suction pipe pressure and cylinder fresh air level constant. Compensatory intervention can be discontinued below predetermined minimum thresholds for the intervention of the second actuator to simplify the method.

An initial initialization stage for the method, in which the actual value of compressor power is determined and stored for subsequent comparison, is not shown in the Figure.

The difference between target and actual values for turbine power is determined in stage 58 and forwarded for evaluation or filtering. A diagnosis 62 of actuation response can be undertaken on the basis of the evaluation or filtering.

In stage 60, essentially correction values for an actuation distance model and target activation values are identified. The activation signals are also taken into account in the adaptation stage 64. The adapted distance model 64 is the basis for determining the target value for turbine power in method stage 46.

Figure 3:
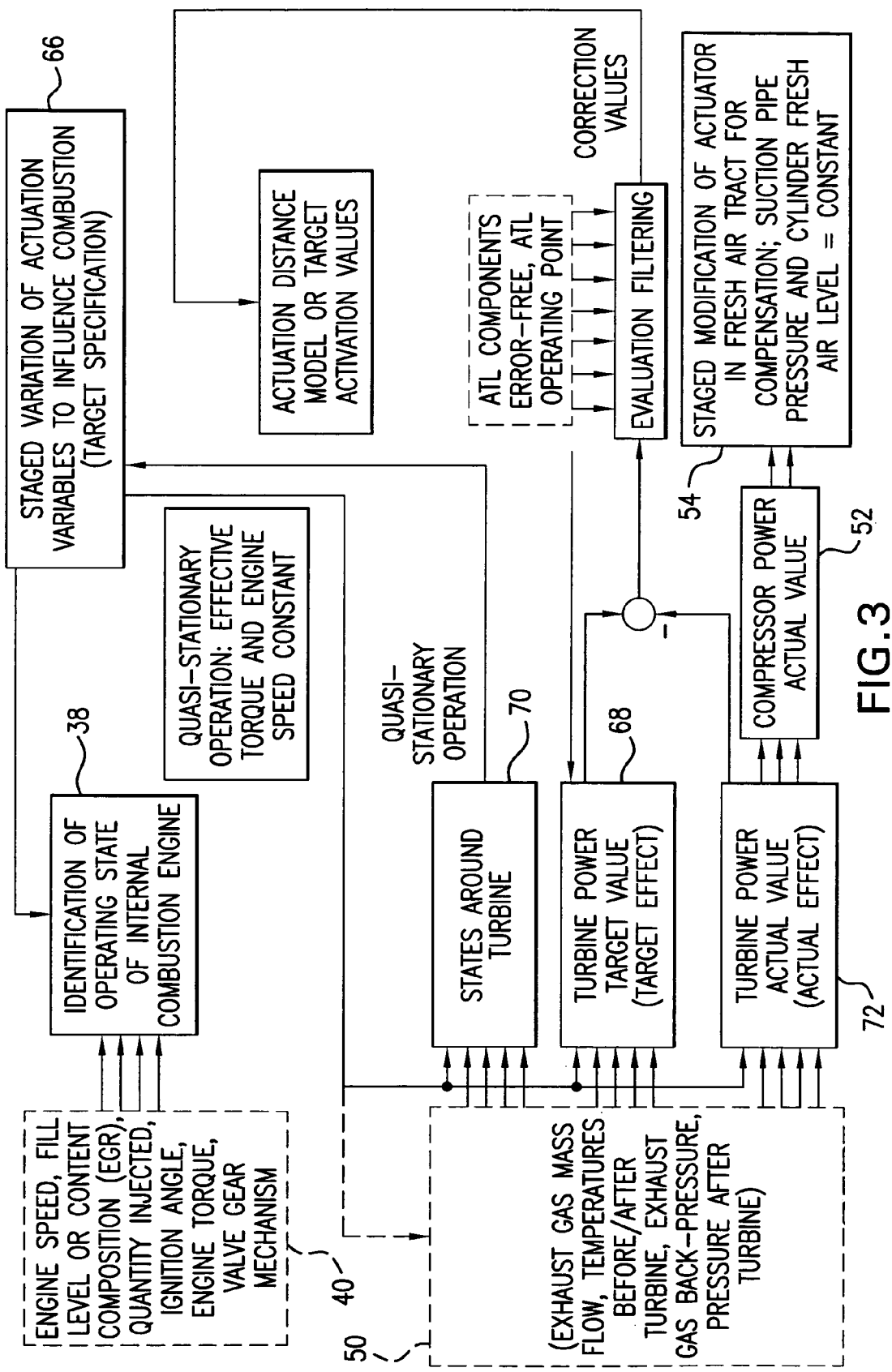
FIG. 3 is a second embodiment of the invention in block diagram form.

FIG. 3 shows another embodiment of the invention. The same method stages are given the same references for better clarity. Only the differences compared with the method disclosed above are described.

Unlike the method described above, in stage 66 of the method shown with reference to FIG. 3, the operating point of the internal combustion engine at constant speed and constant effective torque is modified by influencing combustion. In stage 68, the expected modification at the turbine is calculated, i.e. the expected modification of the turbine when the first actuator is not activated in the exhaust tract. In stage 68, therefore the target value for turbine power in the event of modification of the operating point is determined without taking into account modification of the first actuator in the exhaust tract. In method stage 68, the target value for turbine power is calculated based on the parameters 50, with these also taking into account modifications to the operating point of the internal combustion engine.

In stage 70, the states at the turbine are determined. In method stage 72 the actual state at the turbine is determined based on the data 50. The data 50 is either directly measured values of parameters at the turbine, such as exhaust gas back-pressure, or using model values for the exhaust tract and the fresh air tract. The actual value for turbine power is converted to the actual value for compressor power 52, the value of which is used as the basis for compensatory intervention of the actuator on the fresh air side, so that the internal combustion engine remains in the stationary or quasi-stationary state. The method described with reference to FIG. 3 is particularly suitable for quasi-stationary operation, in which the effective torque and engine speed are constant.

The method described above makes use of the fact that both the exhaust turbocharger and also the internal combustion engine can be operated in the stationary state in different operating points in a manner not noticed by the driver. Compared with the intake side, the actuator is subject to very severe conditions on the exhaust side. The inventive method makes it possible to adapt the model parameters for the actuation distance. Intervention by the first actuator is then compensated for on the intake side.

What is claimed is:

1. A method for adapting an actuation distance model for an actuator for an exhaust turbocharger in an internal combustion engine, comprising:
   identifying a stationary and quasi-stationary operating state of the internal combustion engine;
   activating a first actuator for the exhaust turbocharger in an exhaust tract and a second actuator in an intake tract so that the internal combustion engine remains in an operating state;
   determining a target value for a state variable at a turbine and subsequent comparison of the target value and measured actual value of the state variable at the turbine, wherein a correction value is identified for the actuation distance model and activation of the first actuator from the difference between the actual value and target values for the state variable.

2. The method according to claim 1, wherein the internal combustion machine remains in the operating state with or without constant operating points for combustion.

3. The method according to claim 1, wherein at least one actuator unit for a waste gate position, a turbine blade angle, a position of a sliding sleeve on the exhaust turbocharger and/or electric actuators with and without position feedback and/or bellows at over- or under-pressure are provided as the first actuator in the exhaust tract.

4. The method according to claim 1, wherein at least one actuator unit for a throttle valve, a return check system or return valve are provided as the second actuator in the intake tract.

5. The method according to claim 1, wherein the static or quasi-static operating state is identified based on the values for engine speed, fill level, content composition during internal exhaust gas recirculation, quantity injected, ignition angle, engine torque and valve gear mechanism.

6. The method according to claim 1, wherein activation of the first actuator is staged, with an extent of the stage and the interval between stages being selected so that the change in the state variables at the turbine or at the compressor of the exhaust turbocharger can be detected at each stage.

7. The method according to claim 1, wherein the second actuator is activated after a delay period.

8. The method according to claim 1, wherein identification of static or quasi-static operating states takes place during unboosted operation.

9. The method according to claim 1, wherein activation of the first actuator takes place in an operating state, in which a change in the exhaust gas back-pressure results in slight modification of the operating state of the internal combustion engine.

10. The method according to claim 1, wherein the operating point of the internal combustion engine the first and second actuators are activated such that the effective torque and engine speed are constant.

11. The method according to claim 1, wherein the state variables of the turbine or at the compressor of the exhaust turbocharger are determined on the basis of a measurement.

12. The method according to claim 10, wherein turbine power or compressor power is provided as the state variable at the turbine or the compressor.

13. The method according to claim 1, wherein the state variables at the turbine or the compressor are determined from measured and model values for the exhaust tract or the intake tract.

14. The method according to claim 13, wherein turbine power or compressor power is provided as the state variable at the turbine or the compressor.

* * * * *